June 3, 1930.  J. F. O'CONNOR  1,761,274
SHOCK ABSORBING MECHANISM FOR VEHICLES
Filed Nov. 12, 1926
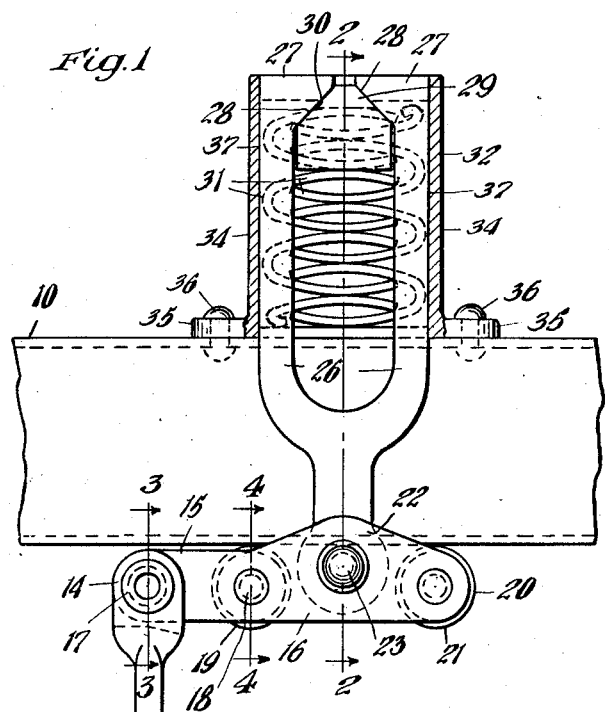
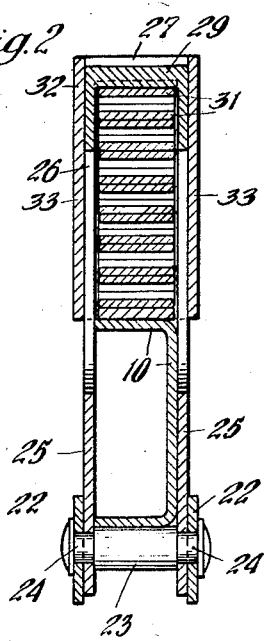
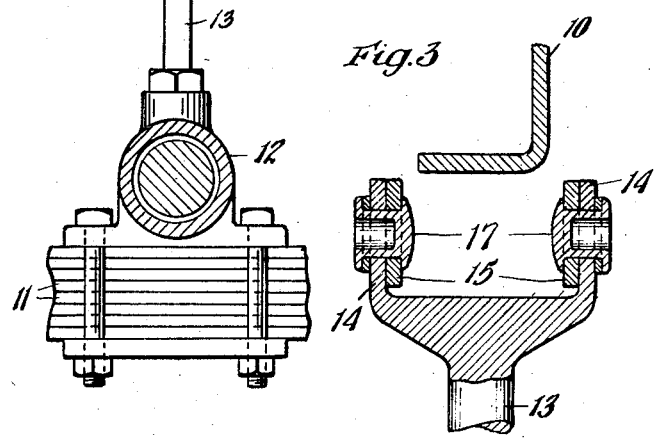
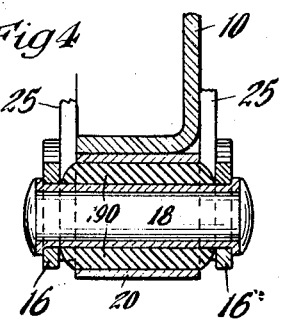
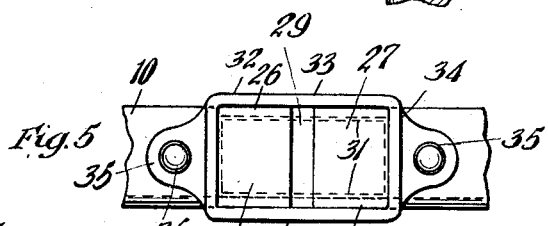
Witness
Wm. Geiger
Inventor
John F. O'Connor
By George I. Haight
His Atty.

Patented June 3, 1930

1,761,274

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

SHOCK-ABSORBING MECHANISM FOR VEHICLES

Application filed November 12, 1926. Serial No. 147,901.

This invention relates to shock absorbing mechanisms for vehicles.

An object of the invention is to provide a shock absorbing mechanism to be used in connection with vehicles, more particularly of the heavy bus type, for aiding in absorbing the shocks transmitted to the vehicle and wherein the usual movement of the axle housing of the vehicle is utilized in imparting reciprocation to an actuating element, which movement is resisted by combined resilient and frictional means carried by the chassis of the vehicle.

A more particular object of the invention is to provide a mechanism of the above character in which the greater the distance of movement of the actuating element in one direction, the more powerful is the resistance to such movement, together with means connecting said element and the movable parts in such manner that upon approach of the axle member and chassis of the vehicle, beyond normal position, it effects a greater movement of the actuating element than when the chassis of the vehicle and the axle member are separated beyond normal position, thereby providing a greater resistance to the approach of the axle member and chassis than to their separation.

Other and further objects of the invention will more clearly appear from the description and claims hereinafter following.

Referring to the drawings forming part of this specification, Figure 1 represents a fragmentary side elevation of the vehicle chassis and spring member, showing the invention applied thereto, parts of said invention being illustrated in elevation and other parts in vertical section. Figure 2 is a transverse sectional view of a portion of the invention taken substantially on a line corresponding to line 2—2 of Figure 1. Figure 3 is a transverse vertical sectional view of a portion of the vehicle chassis, and of the means for imparting movement to the actuating element, taken substantially on the line 3—3 of Figure 1. Figure 4 is a transverse vertical section of the invention taken on line 4—4 of Figure 1. And Figure 5 is a top plan view of the invention.

Referring more particularly to the drawings, 10 represents a channel-shaped side frame or chassis member of usual construction, 11 represents a spring assembly, and 12 an axle housing of a type commonly in use.

Secured to the axle member by any suitable means is a connecting link 13, the upper end of which is provided with spaced ears 14—14 to which ends 15—15, of lever members 16—16 are pivotally connected by rivets 17—17. The lever members 16—16 are disposed at an angle to the link portion 13, and at a point spaced from the pivots 17—17, there is provided a rotatable pin 18 which connects the lever members 16—16, and upon said pin there is mounted a roller 19 comprising an annular sleeve 190 of live rubber, surrounded by a metallic tread member 20, as best shown in Figure 4, said tread member being adapted to engage the under-surface of the bottom flange of the frame member 10 as best seen in Figure 4. The extreme ends of the lever members 16—16 opposite the ends 15—15 are provided with a roller 21 of a construction identically similar to that just described, the roller 21 also being adapted to bear upon the bottom flange of the frame member 10. Intermediate the pivotal points of the rollers 19 and 21, the lever members 16—16 are somewhat enlarged as indicated at 22, and pivotally connected to each of the lever members 16—16, approximately centrally between the pivot points of the two rollers and somewhat above a line extending through the same, is a pivot pin 23, having reduced portions at opposite ends as indicated at 24—24 upon which are pivotally connected spaced yoke or actuating members 25—25. As best shown in Figures 1 and 2, each of the yoke members 25 is relatively thin in cross sectional thickness, and includes a pair of forked or spaced arms 26—26, which at their upper ends are connected with the upper ends of the yoke 23 at the opposite side of the frame member 10 by means of connecting webs 27—27. The upper ends of the legs 26—26 of the yoke member 25 and outer edges of the webs 27—27 converge to provide oppositely disposed friction surfaces 28—28.

Co-operating with the friction faces 28—28 is a wedge member 29 which is provided with wedge surfaces 30—30 adapted to co-operate with the friction surfaces 28—28 of the yoke members 25—25. The member 29 is in the form of a follower, and rests upon a plurality of springs 31. Each of the springs 31 is of looped formation having spaced legs between which the legs of other loop springs are disposed, to provide a spring assembly of engaging spring members as best shown in Figures 1 and 2, against which the follower 29 bears.

The springs 31 are encased within a housing 32, said housing being provided with side walls 33—33 and end walls 34—34, the end walls of the housing having ears 35—35 which are secured to the frame member 10 by rivets indicated at 36. The inner surfaces of the end walls 34—34 provide friction surfaces 37—37 which co-operate with the adjacent portion of the legs 26—26 of the yoke members 25—25 when the device is operated.

In operation, assuming that an obstruction is encountered which initially causes the approach of the axle housing 12 and frame member 10, such movement will be transmitted through the link 13 to the lever members 16—16, which during this action, rock about the roller 19, and effect downward movement of the pivot pin 23 to which the yoke members 25—25 are connected, thereby bringing about downward reciprocation of the legs 26—26 of the yokes. Downward movement of the legs 26—26 of the yokes effects downward movement of the follower 29, against the resistance offered by the springs 31, and due to the presence of the wedge surfaces 30—30 upon the follower coacting with the friction surfaces 28—28 upon the upper ends of the yoke members, the legs 26—26 of said yoke members are spread in opposite directions, so as to come in frictional contact with the end walls 34—34 of the housing 32, thereby providing a combined frictional and resilient resistance to the downward movement of the actuating element in the form of the yokes 25—25, which results in retardation to the approach of the frame member 10 and axle housing 12, thereby aiding the spring in absorbing the shock.

Upon separation of the frame member 10 and spring assembly 11, the link 13 will be moved downwardly, which will swing the lever members 16—16 about the roller 21, as a fulcrum, bringing about corresponding downward movement of the yoke members 25—25, which effects movement of the follower, spreading of the legs 26—26 of the yoke members and consequent frictional engagement with the end walls 34—34 of the housing 32 in the same maner proviously referred to as resulting upon approach of the frame member 10 and axle housing 12; however, it should be particularly observed that the movement of the yoke members 25—25 is considerably less when the lever means swing about the roller 21 as a fulcrum than when they swing about the roller 19 as a fulcrum, thereby affording a greater resistance to the approach of the frame member 10 and spring member 11, than that which occurs when said members are separated, which, of course, is a desirable construction as the greater resistance is utilized in retarding the approach of the frame member 10 and spring member 11, which causes the most violent and disagreeable shocks.

While I have herein shown and described what I consider the preferred manner of carrying out the invention, the same is merely illustrative, and I contemplate all changes and modifications which come within the scope of the claims appended hereto.

I claim:

1. In a shock absorbing device of the character described, the combination with relatively movable members; of an actuating element reciprocably mounted on one of said members; means on said member for developing resistance to reciprocation of said actuating element, said means being constructed to develop increased resistance the greater the extent of movement of said actuating element; and means connected to the other member and partaking of the movement thereof, said means engaging said actuating element to effect greater movement thereof for developing increased resistance upon approach of said members beyond normal position, than upon separation of said members beyond normal position.

2. In a shock absorbing device of the character described, the combination with relatively movable members; of an actuating element; means upon one of said members for developing resistance to reciprocation of said element in one direction, said means being arranged to develop increasing resistance the greater the movement of said element in said direction; and means connecting with the other of said members for moving said element in the same direction, both on approach and separation of said relatively movable members, and effecting greater movement of said element for the same amount of relative movement of said members when said members approach beyond normal position than when the same separate beyond normal position.

3. In a device of the character described, the combination with relatively movable members; of an actuating element; means mounted on said members for developing resistance to movement of said element in one direction; and lever means connected adjacent one end to said element and connected at the other end with the other of said members, said lever having two different fulcrum points on said first named member at opposite sides of the connection therewith, thereby effecting movement of said actuating element in the same direction upon approach of said members or separation of said members beyond normal position.

4. In a device of the character described, the combination with a frame member, and a spring member relatively movable thereto; of an actuating member; means carried by said frame member for developing resistance to the movement of said actuating member in one direction; lever means connected to said actuating element; means providing fulcrum points at different points on said lever means depending upon the direction of movement thereof; and means connected to said spring member and adapted to impart movement to said lever means in opposite directions.

5. In a device of the character described, the combination with a support for vehicles including body and an axle member and spring means interposed therebetween; of a housing mounted on one of said members and provided with friction surfaces; of an actuating element including spaced leg portions; wedge block for spreading said leg portions to bring about frictional engagement of the latter with the friction surfaces of said housing; fixed abutment means; spring means interposed between the wedge block and abutment means, apposing movement of said wedge block; imparting movement to said actuating element connected to the other member.

6. In a device of the character described, the combination with a support; of a housing mounted on said support and provided with friction surfaces; an actuating element within the housing having spaced leg portions provided with friction surfaces adapted to co-act with the friction surfaces of said housing, said leg portions also having wedge faces; yieldable means in said housing; a fixed abutment for said yielding means; a wedging member bearing against said yieldable means and having wedge faces engaged by the wedge faces of the leg portions for spreading the leg portions of said actuating element upon movement in one direction to bring the same into tight frictional contact with the housing; and means for moving said actuating element in said direction.

7. In a device of the character described, the combination with relatively movable members; of a housing mounted on one of said members; of an actuating element reciprocably mounted with respect to said housing and including spaced leg portions adapted to frictionally co-act with the walls of said housing; yieldably resisted means in said housing for spreading said legs to effect frictional co-action with the walls of said housing upon movement of said element in one direction; and means connecting with the other of said members and adapted to move said element in actuating direction a greater distance upon approach of said members beyond normal position, than upon separation of said members beyond normal position.

8. In a device of the character described, the combination with a frame member and an axle member; of a housing mounted upon said frame member and provided with friction surfaces; of an actuating member reciprocably mounted in said housing and provided with spaced leg portions having friction surfaces and adapted to co-act with the friction surfaces of said housing; yieldably resisted wedge means for spreading the legs of said element into frictional engagement with said housing upon downward movement of said element; lever means pivotally connected intermediate its ends to said actuating element; a plurality of fulcrum rollers, one of which is located at one side of the pivotal connection of said lever means with said actuating element, and the other of said rollers at the opposite side of said pivotal connection; and means connected to said axle member for moving said lever means in opposite direction.

9. In a device of the character described, the combination with a frame member and an axle member; of a housing mounted upon said frame member and provided with friction surfaces; of an actuating member reciprocably mounted in said housing and provided with spaced leg portions having friction surfaces and adapted to co-act with the friction surfaces of said housing; yieldably resisted wedge means for spreading the legs of said element into frictional engagement with said housing upon downward movement of said element; lever means pivotally connected intermediate its ends to said actuating element; a plurality of fulcrum rollers, one of which is located at one side of the pivotal connection of said lever means with said actuating element, and the other of said rollers at the opposite side of said pivotal connection, each of said rollers including a rubber sleeve, and a metallic tread; and means connected to said axle member for moving said lever means in opposite direction.

10. In a shock absorbing device of the character described, the combination with a frame member and an axle member of a vehicle, and a vehicle spring interposed between said axle and frame for supporting the frame; of an actuating element connected to one of said members and adapted to be moved relatively to the other member upon relative movement of the frame and axle member toward and away from each other; compressible resistance means yieldingly opposing relative movement of said frame and axle member toward and away from each other; and mechanism for transmitting the actuating force from said actuating element to said resistance means, effective to compress said resistance means a certain amount during the flexing of the vehicle spring in one direction during a certain relative movement of the axle and body, and to compress the resistance means to a greater extent during flexing of the vehicle spring in the opposite direction during the same amount of relative movement of said axle and body.

In witness that I claim the foregoing I have hereunto subscribed my name this 8th day of November, 1926.

JOHN F. O'CONNOR.